United States Patent
Nishikawa et al.

(10) Patent No.: US 7,821,770 B2
(45) Date of Patent: Oct. 26, 2010

(54) DIELECTRIC CERAMIC COMPOSITION, MULTI-LAYER CERAMIC CAPACITOR AND MANUFACTURING METHOD THEREOF

(75) Inventors: Jun Nishikawa, Takasaki (JP); Jun Ogasawara, Takasaki (JP); Nobuyuki Koide, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 450 days.

(21) Appl. No.: 11/869,872

(22) Filed: Oct. 10, 2007

(65) Prior Publication Data

US 2008/0089008 A1   Apr. 17, 2008

(30) Foreign Application Priority Data

Oct. 13, 2006   (JP) .............................. 2006-279592

(51) Int. Cl.
*H01G 4/06* (2006.01)
*C04B 35/00* (2006.01)

(52) U.S. Cl. .................... 361/321.2; 361/311; 501/137; 29/25.42

(58) Field of Classification Search ................. 361/311, 361/321.1, 321.2, 321.3, 321.4, 321.5; 501/136–139
See application file for complete search history.

(56) References Cited

U.S. PATENT DOCUMENTS 5,822,176 A * 10/1998 Sano et al. ............... 361/321.4

FOREIGN PATENT DOCUMENTS

| JP | 2001-039765 A |   | 2/2001 |
| JP | 2005-272263 A |   | 10/2005 |
| JP | 2006008460 A | * | 1/2006 |

* cited by examiner

*Primary Examiner*—Eric Thomas
(74) *Attorney, Agent, or Firm*—Law Office of Katsuhiro Arai

(57) ABSTRACT

A multi-layer ceramic capacitor has a temperature characteristic satisfying an X8R property and has a high specific resistance under a high temperature circumstance, in which the dielectric ceramic composition forming the dielectric ceramics is expressed by a formula: $BaTiO_3 + aMgO + bMO_x + cReO_{3/2} + dSiO_2$, wherein MgO represents MgO conversion, $MO_x$ represents oxide conversion for 1 atom in 1 molecule of at least one metal selected from V, Cr, and Mn, $ReO_{3/2}$ represents oxide conversion for 1 atom in 1 molecule of at least one rare earth metal selected from Sm, Eu, Gd, Tb, Dy, Ho, Er, Tm, Yb, and Y, and $SiO_2$ represents $SiO_2$ conversion, and wherein $0.4 \leq a \leq 3.0$ mol, $0.05 \leq b \leq 0.4$ mol, $6.0 \leq c \leq 16.5$ mol, $3.0 \leq d \leq 5.0$ mol, $2.0 \leq c/d \leq 3.3$, based on 100 mol of $BaTiO_3$.

15 Claims, 1 Drawing Sheet

DIELECTRIC CERAMIC COMPOSITION, MULTI-LAYER CERAMIC CAPACITOR AND MANUFACTURING METHOD THEREOF

BACKGROUND OF THE INVENTION

1. Field of the Invention

The present invention concerns a dielectric ceramic composition mainly comprising barium titanate ($BaTiO_3$) and a multi-layer ceramic capacitor using the same and, particularly, a multi-layer ceramic capacitor having internal electrodes formed of Ni or an Ni alloy and an electrostatic capacity with less temperature dependence.

2. Description of Related Art

For multi-layer ceramic capacitors used for electronic equipment such as portable equipment and telecommunication equipment, demand for reduction of size and increase of the capacitance has increased more and more. Such small-sized multi-layer ceramic capacitors having large capacity includes a multi-layer ceramic capacitor in which the internal electrode is constituted with Ni, for example, as shown in JP-A-2001-39765. Such a multi-layer capacitor can provide a multi-layer capacitor that satisfies an X7R property (satisfying the rate of permittivity change within ±15% within a temperature range of from -55° C. to 125° C. with 25° C. as a reference), having a permittivity of 2500 or higher, and having excellent reliability even when it is lamellated.

However, reliability under severe circumstances has been required in recent years for such multi-layer ceramic capacitors depending on the application use. For example, the multi-layer ceramic capacitors have been used for car-mounted electronic equipment such as electronic engine control units and anti-lock brake systems mounted in engine rooms of cars. In such car-mounted electronic equipment, since a stable operation is demanded under conditions of a low temperature lower than −20° C. or higher than +130° C., good temperature stability even under such conditions has been required also for the multi-layer ceramic capacitors used for the car-mounted electronic equipment.

For coping with such a demand, a dielectric ceramic composition and a multi-layer ceramic capacitor satisfying the X8R property (rate of permittivity change within ±15% within a temperature range of from -55° C. to 150° C. with 25° C. as a reference) are proposed in, for example, JP-A-2005-272263.

However, the dielectric ceramic composition and the multi-layer ceramic capacitor described above involved a problem that a sufficient specific resistance can not always be obtained in a case of further reducing the thickness of dielectric ceramics between internal electrodes for further reducing the size and increasing the capacitance. Particularly, they involved a problem that the specific resistance is not sufficient under a high temperature circumstance exceeding 125° C.

SUMMARY OF THE INVENTION

In an embodiment, the present invention has been proposed for solving one or more of the aforesaid problems and it is at first intended to provide a multi-layer ceramic capacitor having a temperature property satisfying an X8R property and a high specific resistance under a high temperature circumstance. It is secondly intended to provide a method of manufacturing such a multi-layer ceramic capacitor. Further, it is thirdly intended to provide a dielectric ceramic composition for use in such a multi-layer ceramic capacitor.

The present invention provides, in a first embodiment, a dielectric ceramic composition, when represented as:

(where MgO represents MgO conversion, $MO_x$ represents oxide conversion for 1 atom in 1 molecule of at least one metal selected from V, Cr, and Mn, $ReO_{3/2}$ represents oxide conversion for 1 atom in 1 molecule of at least one rare earth metal selected from Sm, Eu, Gd, Tb, Dy, Ho, Er, Tm, Yb, and Y, and $SiO_2$ represents $SiO_2$ conversion), in a range:

$0.4 \leq a \leq 3.0$ mol
$0.05 \leq b \leq 0.4$ mol
$6.0 \leq c \leq 16.5$ mol
$3.0 \leq d \leq 5.0$ mol
$2.0 \leq c/d \leq 3.3$
based on 100 mol of $BaTiO_3$.

According to the first embodiment, a dielectric ceramic composition having a temperature characteristic satisfying the X8R property and a specific resistance of higher than 100 MΩm under high temperature conditions can be provided.

Further, the invention provides, in a second embodiment, a dielectric ceramic composition wherein the average value for the particle diameters of $BaTiO_3$ used as the starting material is from 0.23 to 0.35 μm.

According to the second embodiment, a dielectric ceramic composition having a specific resistance of higher than 1000 MΩm under a high temperature circumstance can be obtained further.

Further, the invention provides, in a third embodiment, a multi-layer ceramic capacitor having substantially hexahedral multi-layer ceramics, internal electrodes formed in the multi-layer ceramics such that they are opposed to each other by way of dielectric ceramics and led to different end faces alternately, end termination electrodes formed on both end faces of the multi-layer ceramics and connected electrically to the internal electrodes led to the end faces respectively, in which the dielectric ceramics are formed of the dielectric ceramic composition shown by the first aspect, and the internal electrodes are formed of Ni or an Ni alloy.

According to the third embodiment, a multi-layer ceramic capacitor having a temperature characteristic satisfying an X8R property, having a specific resistance of higher than 100 MΩm under a high temperature circumstance and, further, a high temperature accelerated life property in excess of 10,000 sec at 150° C. -25 V/μm can be provided.

Further, the invention provides, in a fourth embodiment, a multi-layer ceramic capacitor in which the dielectric ceramics are formed of the dielectric ceramic composition shown by the second aspect.

According to the fourth embodiment, a multi-layer ceramic capacitor having a specific resistance of higher than 1000 MΩm under a high temperature circumstance, and a high temperature accelerated life property exceeding 100,000 seconds at 150° C.-25 V/μm can be provided.

Further, in another embodiment, the present invention proposes a method of manufacturing a multi-layer ceramic capacitor including a step of molding a dielectric ceramic composition into a ceramic green sheet, a step of forming internal electrodes on the ceramic green sheet, a step of stacking the ceramic green sheet formed with the internal electrodes thereby forming uncalcined ceramic layered body, a step of baking the uncalcined ceramic layered body, and a step of forming end termination electrodes, in which the dielectric ceramic composition is a dielectric ceramic composition shown by the first aspect.

According to the manufacturing method, a multi-layer ceramic capacitor having a temperature characteristic satisfying an X8R property, having a specific resistance of higher than 100 MΩm under a high temperature circumference and, further, having a high temperature accelerated life property exceeding 10,000 sec under 150° C. -25 V/μm can be provided.

Further, in still another embodiment, the invention provides a method of manufacturing a multi-layer ceramic capacitor in which the temperature-fall speed is controlled at from 100° C./hr to 500° C./hr upon lowering the temperature from a baking temperature to room temperature in the step of baking the uncalcined ceramic layered body.

This manufacturing method can manufacture a multi-layer ceramic capacitor having further preferred temperature stability such as a rate of permittivity change (or electrostatic capacity) within ±10% within a temperature range from −55° C. to 150° C. with 25° C. as a reference.

According to embodiments of the invention, a multi-layer ceramic capacitor and a multi-layer ceramic composition constituting the multiplayer ceramic capacitor having a temperature property satisfying an X8R property and having a specific resistance higher than 100 MΩm under a high temperature circumstance can be obtained.

In the present invention, the endpoints of the ranges recited can be included in embodiments and excluded in other embodiments.

For purposes of summarizing the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

DETAILED DESCRIPTION OF THE INVENTION

Figure 1:
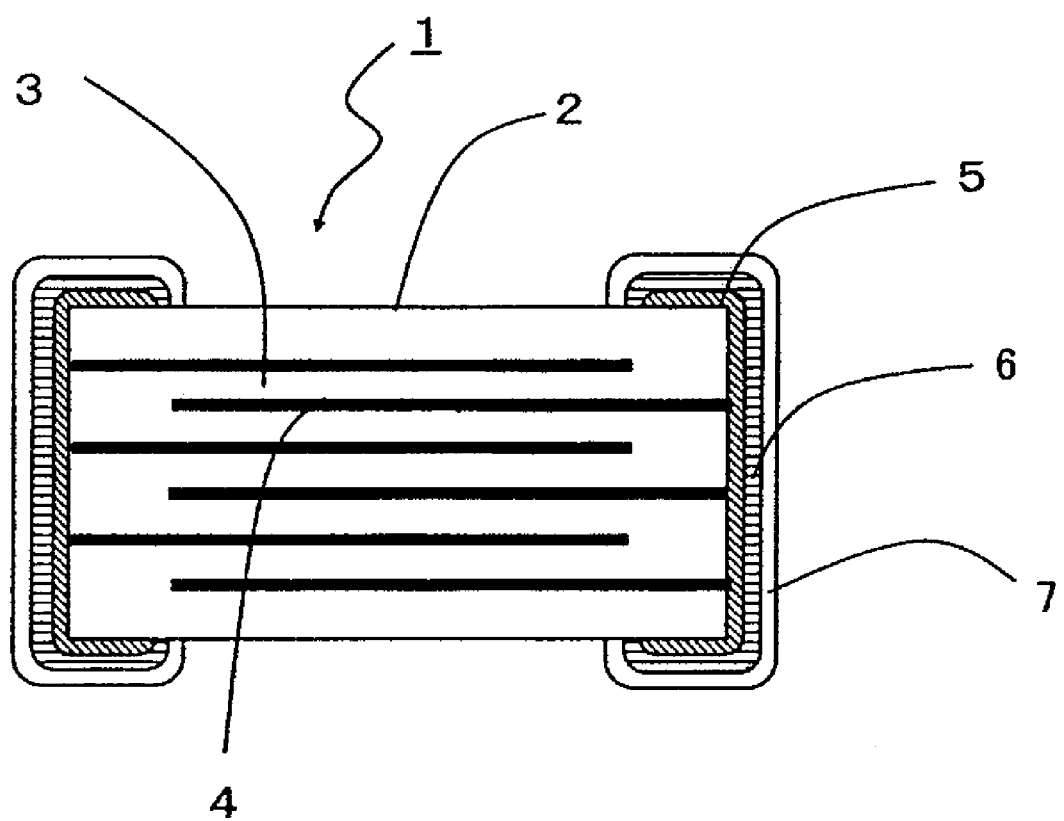
FIG. 1 is a schematic view showing a cross section of a multi-layer ceramic capacitor applicable in an embodiment of the present invention (in an embodiment, the number of layers may be 100 to 1,000). The drawing is oversimplified for illustrative purposes and is not to scale.

The present invention will be explained in detail with reference to preferred embodiments. However, the preferred embodiments are not intended to limit the present invention.

A preferred embodiment according to the dielectric ceramic composition of the invention is to be described. The dielectric ceramic composition of an embodiment of the invention is a composition formed by mixing $BaTiO_3$, MgO, $MO_x$ (in which $MO_x$ is oxide conversion for 1 atom in 1 molecule of at least one metal selected from V, Cr, and Mn), $ReO_{3/2}$ (in which $ReO_{3/2}$ is oxide conversion for 1 atom in 1 molecule of at least one rare earth metal selected from Sm, Eu, Gd, Tb, Dy, Ho, Er, Tm, Yb, and Y) and $SiO_2$ at the composition ratio described above, MgO shows the additive amount of Mg as a conversion of MgO and in a case where Mg is added, a compound other than MgO may also be used. Further $SiO_2$ also shows the additive amount of Si as a conversion of $SiO_2$, and a compound other than $SiO_2$ may also be used. $BaTiO_3$ is synthesized by any of methods of solid state process, hydrothermal method, oxalic acid method, or sol-gel method.

Such a dielectric ceramic composition is obtained as described below. First, the starting materials are prepared by weighing MgO by from 0.4 to 3.0 mol, an oxide of V, Cr, or Mn ($Mo_x$) by from 0.05 to 0.4 mol, an oxide of rare earth ($ReO_{3/2}$) by from 6.0 to 16.5 mol, and $SiO_2$ by from 3.0 to 5.0 mol based on 100 mol of $BaTiO_3$. In this case, the ratio of the mol number c for $ReO_{3/2}$ and the mol number b for $SiO_2$ (c/d) is controlled to 2.0 to 3.3. The mol number shows the mol number as converted to an oxide for 1 atom in 1 molecule. For example, $Ho_2O_3$ is shown by the mol number converted as $HoO_{3/2}$ and $V_2O_5$ is shown by the mol number converted as $VO_{5/2}$. Water is added to the starting materials described above and they are wet-mixed by using, for example, a ball mill, bead mill and dispamil. The mixture is dried and calcined at 400° C. to obtain a dielectric ceramic composition. The obtained dielectric ceramic powder is used for forming a dielectric ceramic layer of a multi-layer ceramic capacitor.

Then, a multi-layer ceramic capacitor according to a preferred embodiment of the invention is to be described. As shown in FIG. 1, a multi-layer ceramic capacitor according to this embodiment includes a substantially hexahedral multi-layer ceramics 2 having dielectric ceramics 3 and internal electrodes 4 formed such that they are opposed to each other by way of the dielectric ceramics 3 and led out to different end faces alternately, in which end termination electrodes 5 are formed on both end faces of the multi-layer ceramics 2 so as to be connected electrically with the internal electrodes. A first plating layer 6 and a second plating layer 7 are formed optionally on the end termination electrodes 5.

Then, a method of manufacturing the multi-layer ceramic capacitor 1 is to be described. At first, a dielectric ceramic composition is provided in an embodiment of the invention. This is mixed with a butyral-based or acrylic-based organic binder, a solvent, and other additives to form a ceramic slurry. The ceramic slurry is sheeted by using a coating device such as a roll coater to form a ceramic green sheet of a predetermined thickness as the dielectric ceramics 3 (ceramic green sheet molding step).

A conductive paste formed of Ni or an Ni alloy is coated in a predetermined pattern by screen printing on the ceramic green sheet to form a conductor layer as the internal electrodes 4 (internal electrode forming step). After laminating ceramic green sheets each formed with the conductor layer by a necessary number of sheets, they are press bonded to form uncalcined ceramic layered body. After cutting and dividing them into individual chips, debinding them in an atmospheric air or a non-oxidation gas such as nitrogen (multi-layer forming step).

After debinding, a conductive paste is coated to the exposed surface of the internal electrodes of individual chips to form a conductor film as end termination electrodes 5 (end termination electrode forming step). Individual chips each formed with the conductor film are baked in a nitrogen - hydrogen atmosphere (oxygen partial pressure: about $10^{-10}$ atm) at a predetermined temperature (baking step). The end termination electrodes 5 may also be formed by baking individual chips to form multi-layer ceramics 2 and then coating and baking a conductive paste containing glass frits to the exposed surface of the internal electrodes. For the end termination electrode 5, a metal identical with that for the internal electrode can be used, as well as Ag, Pd, AgPd, Cu, Cu alloy, or the like. Further, a first plating layer 6 is formed with Ni, Cu, etc. on the end termination electrode 5 and a second plating layer 7 is formed further thereon with Sn or an Sn alloy, etc. to obtain the multi-layer ceramic capacitor 1.

In the present disclosure where conditions and/or structures are not specified, the skilled artisan in the art can readily provide such conditions and/or structures, in view of the present disclosure, as a matter of routine experimentation.

In the present examples, the numerical numbers applied in embodiments can be modified by a range of at least ±50% in other embodiments, and the ranges applied in embodiments may include or exclude the endpoints.

EXAMPLE

Example 1

$BaTiO_3$, with an average value for the particle diameters of 0.45 μm, and MgO, $Mn_2O_3$ (as $MnO_{3/2}$ conversion), $Ho_2O_3$ (as $HoO_{3/2}$ conversion) and $SiO_2$ were provided by weighing them so as to form the composition ratio in Table 1 as the starting materials. The average value for the particle diameters of $BaTiO_3$ is determined by observing particles under SEM (Scanning Electron Microscope), measuring the maximum diameter in a predetermined direction for the number of 300 and taking arithmetic mean of the maximum diameter for the number of particles of 300. The subsequent indication for the average value of particle diameters for $BaTiO_3$ is also identical.

The provided $BaTiO_3$, MgO, $Mn_2O_3$, $Ho_2O_3$, and $SiO_2$ were wet mixed in a ball mill and calcined at 400° C. after drying to obtain a dielectric ceramic powder.

Polyvinyl butyral, an organic solvent, and a plasticizer were added and mixed to the powder described above to form a ceramic slurry. The ceramic slurry was sheeted by a roll coater to obtain a ceramic green sheet of 5 μm thickness. An Ni internal electrode paste was coated on the ceramic green sheet by screen printing to form an internal electrode pattern. The ceramic green sheets each formed with the internal electrode pattern were laminated 21 times, press bonded and cut and divided each into a size of 4.0 ×2.0 mm to form raw chips. The raw chips were debindered in a nitrogen atmosphere, coated with an Ni end termination electrode paste and baked being kept in a reducing atmosphere (nitrogen - hydrogen atmosphere, oxygen partial pressure: $10^{-10}$ atm) at 1200° C. for one hour and then the temperature was lowered at a temperature-fall speed of 750° C./hr to a room temperature.

For the thus obtained multi-layer ceramic capacitors each having a dielectric ceramic layer sized 3.2×1.6 mm with 3 μm thickness, permittivity, temperature characteristic (TC), specific resistance, and life time property were measured and collectively shown in Table 2. The temperature characteristic was shown by the maximum value for the rate of capacitance change within a range from −55° C. to 150° C. with 25° C. being as a reference. Further, for the specific resistance, a resistance value was measured by a mega ohmmeter at a temperature of 170° C. and at a measurement voltage of 7 V/μm, and the specific resistance was calculated based on the intersection area of the internal electrodes and the thickness of the dielectric ceramics between the internal electrodes. The procedure was conducted for each of the samples selected at random by the number of ten to determine an average value therefor. Further, the high temperature accelerated life property was determined under a load of 150° C. and 25 V/μm for the samples by the number of 10 selected at random for each of the samples, and determined as an average value of the time where the resistance value for the 10 samples was decreased to less than 1 MΩ.

TABLE 1

|   |   | $BaTiO_3$ Additive amount mol | Mg Additive amount mol | M Element | M Additive amount mol | Re Element | Re Additive amount mol | Si Additive amount mol | Re/Si |
|---|---|---|---|---|---|---|---|---|---|
| * | 1 | 100 | 1.0 | Mn | 0.2 | Ho | 6 | 2.5 | 2.40 |
|   | 2 | 100 | 1.0 | Mn | 0.2 | Ho | 6 | 3 | 2.00 |
| * | 3 | 100 | 1.0 | Mn | 0.2 | Ho | 6 | 3.5 | 1.71 |
| * | 4 | 100 | 1.0 | Mn | 0.2 | Ho | 5 | 3 | 1.67 |
|   | 5 | 100 | 1.0 | Mn | 0.2 | Ho | 7 | 3 | 2.33 |
| * | 6 | 100 | 1.0 | Mn | 0.2 | Ho | 9.9 | 2.5 | 3.96 |
|   | 7 | 100 | 1.0 | Mn | 0.2 | Ho | 9.9 | 3 | 3.30 |
|   | 8 | 100 | 1.0 | Mn | 0.2 | Ho | 9.9 | 3.5 | 2.83 |
|   | 9 | 100 | 1.0 | Mn | 0.2 | Ho | 8 | 3 | 2.67 |
| * | 10 | 100 | 1.0 | Mn | 0.2 | Ho | 10 | 3 | 3.33 |
|   | 11 | 100 | 1.0 | Mn | 0.2 | Ho | 10 | 4 | 2.50 |
|   | 12 | 100 | 1.0 | Mn | 0.2 | Ho | 10 | 5 | 2.00 |
| * | 13 | 100 | 1.0 | Mn | 0.2 | Ho | 10 | 6 | 1.67 |
| * | 14 | 100 | 1.0 | Mn | 0.2 | Ho | 9.9 | 5 | 1.98 |
|   | 15 | 100 | 1.0 | Mn | 0.2 | Ho | 11 | 5 | 2.20 |
| * | 16 | 100 | 1.0 | Mn | 0.2 | Ho | 16.5 | 4 | 4.13 |
|   | 17 | 100 | 1.0 | Mn | 0.2 | Ho | 16.5 | 5 | 3.30 |
| * | 18 | 100 | 1.0 | Mn | 0.2 | Ho | 16.5 | 6 | 2.75 |
|   | 19 | 100 | 1.0 | Mn | 0.2 | Ho | 15 | 5 | 3.00 |
| * | 20 | 100 | 1.0 | Mn | 0.2 | Ho | 18 | 5 | 3.60 |

* Out of the range of an embodiment of the invention

TABLE 2

|   |   | Permittivity | TC (%) | Specific resistance Ωm | Life time property sec |
|---|---|---|---|---|---|
| * | 1 | Sinterability was insufficient and property could not be evaluated | | | |

TABLE 2-continued

|   | Permittivity | TC (%) | Specific resistance Ωm | Life time property sec |
|---|---|---|---|---|
| 2 | 2035 | −14.3 | 2.0E+09 | 7.2E+04 |
| * 3 | 2833 | −19.8 | 9.1E+08 | 8.2E+03 |
| * 4 | 2589 | −22.3 | 6.8E+08 | 4.8E+03 |
| 5 | 2399 | −10.7 | 1.0E+09 | 5.5E+04 |
| * 6 | Sinterability was insufficient and property could not be evaluated | | | |
| 7 | 2601 | −14.0 | 1.1E+09 | 1.7E+04 |
| 8 | 2204 | −13.3 | 1.7E+09 | 9.3E+04 |
| 9 | 2189 | −11.3 | 1.2E+09 | 1.9E+04 |
| * 10 | Sinterability was insufficient and property could not be evaluated | | | |
| 11 | 2159 | −13.8 | 1.2E+09 | 2.9E+04 |
| 12 | 2463 | −12.4 | 6.0E+08 | 9.2E+04 |
| * 13 | 1499 | −15.8 | 8.9E+08 | 8.0E+03 |
| * 14 | 2187 | −16.5 | 7.3E+08 | 9.1E+03 |
| 15 | 2335 | −10.5 | 1.4E+09 | 4.7E+04 |
| * 16 | Sinterability was insufficient and property could not be evaluated | | | |
| 17 | 2343 | −11.7 | 1.5E+08 | 3.2E+04 |
| * 18 | 1675 | −12.0 | 2.4E+09 | 1.0E+04 |
| 19 | 2140 | −12.6 | 2.3E+08 | 9.4E+04 |
| * 20 | Sinterability was insufficient and property could not be evaluated | | | |

* Out of the range of an embodiment of the invention

From the result described above, it was found that within the range where $ReO_{3/2}$ was from 6.0 to 16.5 mol, $SiO_2$ was 3.0 to 5.0 mol, and the ratio c/d for the mol number c of $ReO_{3/2}$ and the mol number d of $SiO_2$ was from 2.0 to 3.3, dielectric ceramic compositions having a permittivity of higher than 2,000, a temperature characteristic satisfying the X8R property and having a specific resistance of higher than 100 MΩm under a high temperature circumstance can be obtained and, further, multi-layer ceramic capacitors having a high temperature accelerated life property exceeding 10,000 sec at 150° C.-25 V/μm can be obtained.

Example 2

Starting materials were prepared so as to provide the composition ratios in Table 3, and dielectric ceramic powders were formed in the same manner as in Example 1. In this case, Ho was replaced with other rare earth elements and the effects thereof were verified.

Multi-layer ceramic capacitors were formed from the dielectric ceramic powders described above in the same manner as in Example 1, and the permittivity, the temperature characteristic (TC), the specific resistance, and the lifetime property were measured and they are collectively shown in Table 4.

TABLE 4

|   | Permittivity | TC (%) | Specific resistance Ωm | Life time property sec |
|---|---|---|---|---|
| 21 | 2050 | −12.7 | 6.0E+08 | 1.6E+04 |
| 22 | 2161 | −11.6 | 1.8E+08 | 5.5E+04 |
| 23 | 2205 | −13.6 | 6.7E+08 | 5.8E+04 |
| 24 | 2181 | −11.6 | 2.2E+08 | 8.9E+04 |
| 25 | 2463 | −13.2 | 9.4E+08 | 7.5E+04 |
| 26 | 2117 | −11.4 | 2.5E+08 | 2.6E+04 |
| 27 | 2468 | −13.3 | 7.4E+08 | 2.5E+04 |
| 28 | 2157 | −14.3 | 2.4E+08 | 4.1E+04 |
| 29 | 2302 | −13.5 | 4.6E+08 | 5.9E+04 |
| 30 | 2198 | −10.8 | 7.7E+08 | 8.8E+04 |

From the results described above, it was found that same effects could be obtained also in a case of replacing the rare earth (Re) with those other than Ho. Further, from the result of sample No. 30, it was found that two kinds of rare earth elements may also be used.

Example 3

Starting materials were prepared so as to provide the composition ratios in Table 5 and dielectric ceramic powders were formed in the same manner as in Example 1. In this case, the additive amount of Mg was changed and the effects thereof were verified.

TABLE 3

|   | $BaTiO_3$ Additive amount mol | Mg Additive amount mol | M Element | M Additive amount mol | Re Element | Re Additive amount mol | Si Additive amount mol | Re/Si |
|---|---|---|---|---|---|---|---|---|
| 21 | 100 | 1.0 | Mn | 0.2 | Y | 8.0 | 3.5 | 2.29 |
| 22 | 100 | 1.0 | Mn | 0.2 | Sm | 8.0 | 3.5 | 2.29 |
| 23 | 100 | 1.0 | Mn | 0.2 | Eu | 8.0 | 3.5 | 2.29 |
| 24 | 100 | 1.0 | Mn | 0.2 | Gd | 8.0 | 3.5 | 2.29 |
| 25 | 100 | 1.0 | Mn | 0.2 | Tb | 8.0 | 3.5 | 2.29 |
| 26 | 100 | 1.0 | Mn | 0.2 | Dy | 8.0 | 3.5 | 2.29 |
| 27 | 100 | 1.0 | Mn | 0.2 | Er | 8.0 | 3.5 | 2.29 |
| 28 | 100 | 1.0 | Mn | 0.2 | Tm | 8.0 | 3.5 | 2.29 |
| 29 | 100 | 1.0 | Mn | 0.2 | Yb | 8.0 | 3.5 | 2.29 |
| 30 | 100 | 1.0 | Mn | 0.2 | Ho:Y = 1:1 | 8.0 | 3.5 | 2.29 |

TABLE 5

|   | BaTiO₃ Additive amount mol | Mg Additive amount mol | M Element | M Additive amount mol | Re Element | Re Additive amount mol | Si Additive amount mol | Re/Si |
|---|---|---|---|---|---|---|---|---|
| * 31 | 100 | 0.2 | Mn | 0.2 | Ho | 8.0 | 3.5 | 2.29 |
| 32 | 100 | 0.4 | Mn | 0.2 | Ho | 8.0 | 3.5 | 2.29 |
| 33 | 100 | 1.0 | Mn | 0.2 | Ho | 8.0 | 3.5 | 2.29 |
| 34 | 100 | 2.0 | Mn | 0.2 | Ho | 8.0 | 3.5 | 2.29 |
| 35 | 100 | 3.0 | Mn | 0.2 | Ho | 8.0 | 3.5 | 2.29 |
| * 36 | 100 | 4.0 | Mn | 0.2 | Ho | 8.0 | 3.5 | 2.29 |

* Out of the range of an embodiment of the invention

Multi-layer ceramic capacitors were formed from the dielectric ceramic powders described above in the same manner as in Example 1, and the permittivity, the temperature characteristic (TC), the specific resistance, and the life time property were measured and they are collectively shown in Table 6.

TABLE 6

|   | Permittivity | TC (%) | Specific resistance Ωm | Life time property sec |
|---|---|---|---|---|
| * 31 | 2550 | −10.9 | 1.1E+09 | 8.5E+03 |
| 32 | 2405 | −12.9 | 1.2E+09 | 1.3E+04 |
| 33 | 2506 | −13.5 | 1.2E+09 | 1.1E+04 |
| 34 | 2442 | −11.9 | 1.7E+09 | 2.2E+04 |
| 35 | 2305 | −14.5 | 2.7E+09 | 4.3E+04 |
| * 36 | 2070 | −16.0 | 2.6E+09 | 2.3E+04 |

* Out of the range of an embodiment of the invention

From the results described above, it was found that within a range of Mg from 0.4 to 3.0 mol, dielectric ceramic compositions having a temperature characteristic satisfying the X8R property and having a specific resistance of higher than 100 MΩm under a high temperature circumstance could be obtained and, further, multi-layer ceramic capacitors having high temperature accelerated life property exceeding 10,000 sec at 150° C.-25 V/μm could be obtained.

Example 4

Starting materials were prepared so as to provide the composition ratios in Table 7 and dielectric ceramic powders were formed in the same manner as in Example 1. In this case, the additive amount of Mn and the type of M were changed and the effects thereof were verified.

TABLE 7

|   | BaTiO₃ Additive amount mol | Mg Additive amount mol | M Element | M Additive amount mol | Re Element | Re Additive amount mol | Si Additive amount mol | Re/Si |
|---|---|---|---|---|---|---|---|---|
| * 37 | 100 | 1.0 | Mn | 0.04 | Ho | 8.0 | 3.5 | 2.29 |
| 38 | 100 | 1.0 | Mn | 0.05 | Ho | 8.0 | 3.5 | 2.29 |
| 39 | 100 | 1.0 | Mn | 0.1 | Ho | 8.0 | 3.5 | 2.29 |
| 40 | 100 | 1.0 | Mn | 0.2 | Ho | 8.0 | 3.5 | 2.29 |
| 42 | 100 | 1.0 | Mn | 0.4 | Ho | 8.0 | 3.5 | 2.29 |
| * 43 | 100 | 1.0 | Mn | 0.5 | Ho | 8.0 | 3.5 | 2.29 |
| 44 | 100 | 1.0 | V | 0.2 | Ho | 8.0 | 3.5 | 2.29 |
| 45 | 100 | 1.0 | Cr | 0.2 | Ho | 8.0 | 3.5 | 2.29 |
| 46 | 100 | 1.0 | V:Mn = 1:1 | 0.2 | Ho | 8.0 | 3.5 | 2.29 |

* Out of the range of an embodiment of the invention

Multi-layer ceramic capacitors were formed from the dielectric ceramic powders described above in the same manner as in Example 1, and the permittivity, the temperature characteristic (TC), the specific resistance, and the lifetime property were measured and they are collectively shown in Table 8.

TABLE 8

|   | Permittivity | TC (%) | Specific resistance Ωm | Life time property sec |
|---|---|---|---|---|
| * 37 | 2505 | −12.7 | 4.3E+07 | 7.9E+03 |
| 38 | 2447 | −10.4 | 2.7E+08 | 1.4E+04 |
| 39 | 2367 | −14.0 | 9.8E+08 | 3.0E+04 |
| 40 | 2327 | −13.0 | 5.1E+08 | 1.3E+04 |
| 42 | 2215 | −13.9 | 3.0E+08 | 4.8E+04 |
| * 43 | 2098 | −11.1 | 1.2E+07 | 3.6E+03 |
| 44 | 2405 | −10.4 | 1.4E+09 | 6.3E+04 |
| 45 | 2155 | −14.0 | 2.2E+09 | 5.1E+04 |
| 46 | 2254 | −13.3 | 8.8E+08 | 3.0E+04 |

* Out of the range of an embodiment of the invention

From the results described above, it was found that within a range of Mn from 0.05 to 0.4 mol, dielectric ceramic compositions having the temperature characteristic satisfying the X8R property and having the specific resistance of higher than 100 MΩm under a high temperature circumstance could be obtained and, further, multi-layer ceramic capacitors having a high temperature accelerated life property exceeding 10,000 sec at 150° C.-25 V/μm could be obtained. Further, it was found from Samples Nos. 44 to 46 that same effects were obtained by also replacing Mn with V or Cr, and two types of metal elements may also be used.

Example 5

Samples with the same composition ratio as in Sample No. 40 and having the average value for the particle diameters of $BaTiO_3$ as shown in Table 9 were prepared and dielectric ceramic powders were formed in the same manner as in Example 1. Then, multi-layer ceramic capacitors were formed from the dielectric ceramic powders as described above in the same manner as in Example 1, and the permittivity, temperature characteristic (TC), the specific resistance and life time property were measured and they are collectively shown in Table 9.

TABLE 9

| | $BaTiO_3$ particle diameter μm | Permittivity | TC (%) | Specific resistance Ωm | Life time property sec |
|---|---|---|---|---|---|
| 40 | 0.45 | 2327 | −13.0 | 5.1E+08 | 1.3E+04 |
| 47 | 0.35 | 2268 | −13.2 | 1.11E+09 | 1.1E+05 |
| 48 | 0.28 | 2351 | −14.3 | 1.38E+09 | 1.3E+05 |
| 49 | 0.27 | 2335 | −12.5 | 1.40E+09 | 1.6E+05 |
| 50 | 0.26 | 2288 | −10.0 | 1.67E+09 | 1.6E+05 |
| 51 | 0.24 | 2176 | −13.7 | 1.78E+09 | 1.8E+05 |
| 53 | 0.23 | 2023 | −11.7 | 2.76E+09 | 1.3E+05 |
| 53 | 0.20 | 2109 | −12.5 | 3.26E+09 | 9.1E+04 |

From the results described above, it was found that within a range of the average value for the particle diameters of $BaTiO_3$ from 0.23 to 0.35 μm, dielectric ceramic compositions having the temperature characteristic satisfying the X8R property and the specific resistance of higher than 1,000 MΩm under a high temperature circumstance could be obtained and multi-layer ceramic capacitor having a high temperature accelerated life property exceeding 100,000 sec at 150° C.-25 V/μm could be obtained.

Example 6

Multi-layer ceramic capacitors were formed in the same manner as in Example 1 by using the dielectric ceramic composition having the composition ratio identical with that of the Sample No. 40. The temperature-fall speed upon lowering the temperature to the room temperature after baking was changed as shown in Table 10, and the permittivity, the temperature characteristic (TC), the specific resistance, and the life time property were measured for each of the samples and shown collectively in Table 10.

TABLE 10

| | Temperature-fall speed ° C./hr | Permittivity | TC (%) | Specific resistance Ωm | Life time property sec |
|---|---|---|---|---|---|
| 40 | 750 | 2327 | −13.0 | 5.1E+08 | 1.3E+04 |
| 54 | 500 | 2367 | −9.8 | 1.34E+09 | 5.4E+04 |
| 55 | 250 | 2380 | −9.1 | 1.40E+09 | 2.5E+04 |
| 56 | 100 | 2446 | −8.7 | 1.50E+09 | 6.7E+04 |
| 57 | 25 | 2597 | −8.2 | 1.57E+09 | 2.6E+04 |

From the results described above, it was found that within a range of the temperature-fall speed of from 100° C./hr to 500° C./hr, the temperature characteristic, that is, the rate of permittivity change (or electrostatic capacity) was within ±10% within the temperature range from −55° C. to 150° C. with 25° C. as a reference. While the effect was obtained also at 25° C./hr, the range from 100° C./hr to 500° C./hr is preferred in view of the production efficiency.

From the results described above, in embodiments, the present invention can provide a multi-layer ceramic capacitor having a temperature characteristic satisfying the X8R property and a specific resistance of higher than 100 MΩm under a high temperature circumstance, and a dielectric ceramic composition constituting the multi-layer ceramic capacitor.

The present application claims priority to Japanese Patent Application No. 2006-279592, filed Oct. 13, 2006, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A dielectric ceramic composition expressed by a formula:

$$BaTiO_3 + aMgO + bMO_x + cReO_{3/2} + dSiO_2$$

wherein MgO represents MgO conversion, $MO_x$ represents oxide conversion for 1 atom in 1 molecule of at least one metal selected from V, Cr, and Mn, $ReO_{3/2}$ represents oxide conversion for 1 atom in 1 molecule of at least one rare earth metal selected from Sm, Eu, Gd, Tb, Dy, Ho, Er, Tm, Yb, and Y, and $SiO_2$ represents $SiO_2$ conversion, and wherein:

$0.4 \leq a \leq 3.0$ mol,
$0.05 \leq b \leq 0.4$ mol,
$6.0 \leq c \leq 16.5$ mol,
$3.0 \leq d \leq 5.0$ mol, and
$2.0 \leq c/d \leq 3.3$,
based on 100 mol of $BaTiO_3$.

2. The dielectric ceramic composition according to claim 1, wherein an average particle diameter of $BaTiO_3$ used as a starting material is from 0.23 to 0.35 μm.

3. A sintered body of a dielectric ceramic composition expressed by a formula:

$$BaTiO_3 + aMgO + bMO_x + cReO_{3/2} + dSiO_2$$

wherein MgO represents MgO conversion, $MO_x$ represents oxide conversion for 1 atom in 1 molecule of at least one metal selected from V, Cr, and Mn, $ReO_{3/2}$ represents oxide conversion for 1 atom in 1 molecule of at least one rare earth metal selected from Sm, Eu, Gd, Tb, Dy, Ho, Er, Tm, Yb, and Y, and $SiO_2$ represents $SiO_2$ conversion, and wherein:

$0.4 \leq a \leq 3.0$ mol,
$0.05 \leq b \leq 0.4$ mol,
$6.0 \leq c \leq 16.5$ mol,
$3.0 \leq d \leq 5.0$ mol, and
$2.0 \leq c/d \leq 3.3$,
based on 100 mol of $BaTiO_3$.

4. The sintered body according to claim 3, which has a permittivity of higher than 2,000, a temperature characteristic satisfying the X8R property, and a specific resistance of higher than 100 MΩm under a high temperature circumstance.

5. The sintered body according to claim 4, wherein the specific resistance is higher than 1,000 MΩm under a high temperature circumstance.

6. A multi-layer ceramic capacitor having a substantially or nearly hexahedral multi-layer ceramics, internal electrodes formed in the multi-layer ceramics such that the internal electrodes are opposed to each other by way of dielectric ceramics and led to different end faces alternately, and end termination electrodes formed on both end faces of the multi-layer ceramics and connected electrically to the internal electrodes led to the end faces respectively, wherein each dielectric ceramic layer composed of a composition expressed by a formula:

$$BaTiO_3 + aMgO + bMO_x + cReO_{3/2} + dSiO_2$$

wherein MgO represents MgO conversion, $MO_x$ represents oxide conversion for 1 atom in 1 molecule of at least one metal selected from V, Cr, and Mn, $ReO_{3/2}$ represents oxide conversion for 1 atom in 1 molecule of at least one rare earth metal selected from Sm, Eu, Gd, Tb, Dy, Ho, Er, Tm, Yb, and Y, and $SiO_2$ represents $SiO_2$ conversion, and wherein:

$0.4 \leq a \leq 3.0$ mol,
$0.05 \leq b \leq 0.4$ mol,
$6.0 \leq c \leq 16.5$ mol,
$3.0 \leq d \leq 5.0$ mol, and
$2.0 \leq c/d \leq 3.3$,
based on 100 mol of $BaTiO_3$, in which the internal electrodes are formed of Ni or an Ni alloy.

7. The multi-layer ceramic capacitor according to claim 6, wherein the ceramic layer has a permittivity of higher than 2,000, a temperature characteristic satisfying the X8R property, and a specific resistance of higher than 100 MΩm under a high temperature circumstance, and the multi-layer ceramic capacitor has a high temperature accelerated life property exceeding 10,000 sec at 150° C.-25 V/μm.

8. The multi-layer ceramic capacitor according to claim 7, which has a high temperature accelerated life property exceeding 100,000 sec at 150° C.-25 V/μm.

9. A method of manufacturing a multi-layer ceramic capacitor comprising:

a step comprising molding a dielectric ceramic composition into a ceramic green sheet, a step comprising forming internal electrodes on the ceramic green sheet, a step comprising stacking the ceramic green sheet formed with the internal electrode to form uncalcined ceramic layered body, a step comprising baking the uncalcined ceramic layered body and a step comprising forming end termination electrodes, wherein the dielectric ceramic composition is expressed by a formula:

$$BaTiO_3 + aMgO + bMO_x + cReO_{3/2} + dSiO_2$$

wherein MgO represents MgO conversion, $MO_x$ represents oxide conversion for 1 atom in 1 molecule of at least one metal selected from V, Cr, and Mn, $ReO_{3/2}$ represents oxide conversion for 1 atom in 1 molecule of at least one rare earth metal selected from Sm, Eu, Gd, Tb, Dy, Ho, Er, Tm, Yb, and Y, and $SiO_2$ represents $SiO_2$ conversion, and wherein:

$0.4 \leq a \leq 3.0$ mol,
$0.05 \leq b \leq 0.4$ mol,
$6.0 \leq c \leq 16.5$ mol,
$3.0 \leq d \leq 5.0$ mol, and
$2.0 \leq c/d \leq 3.3$,
based on 100 mol of $BaTiO_3$.

10. The method of manufacturing a multi-layer capacitor according to claim 9, wherein the step comprising baking the uncalcined ceramic layered body further comprises lowering from a firing temperature to room temperature at a temperature-fall speed of 100° C./hr to 500° C./hr.

11. The method of manufacturing a multi-layer capacitor according to claim 9, wherein the step comprising molding the dielectric ceramic composition uses $BaTiO_3$ as a starting material having an average particle diameter of 0.23 to 0.35 μm.

12. A multi-layer ceramic capacitor comprising:

substantially or nearly hexahedral multi-layer ceramics comprised of a plurality of dielectric ceramic layers stacked in a thickness direction and having two end surfaces opposite to each other formed by ends of the plurality of dielectric ceramic layers;

internal electrodes each formed between the respective dielectric ceramic layers stacked next to each other, said internal electrodes extending alternately from the respective two end surfaces; and end termination electrodes formed on both of the two end surfaces and electrically connected to each of the internal electrodes extending therefrom, wherein each dielectric ceramic layer is a sintered body of a ceramic composition expressed by a formula:

$$BaTiO_3 + aMgO + bMO_x + cReO_{3/2} + dSiO_2$$

wherein MgO represents MgO conversion, $MO_x$ represents oxide conversion for 1 atom in 1 molecule of at least one metal selected from V, Cr, and Mn, $ReO_{3/2}$ represents oxide conversion for 1 atom in 1 molecule of at least one rare earth metal selected from Sm, Eu, Gd, Tb, Dy, Ho, Er, Tm, Yb, and Y, and $SiO_2$ represents $SiO_2$ conversion, and wherein:

$0.4 \leq a \leq 3.0$ mol,
$0.05 \leq b \leq 0.4$ mol,
$6.0 \leq c \leq 16.5$ mol,
$3.0 \leq d \leq 5.0$ mol, and
$2.0 \leq c/d \leq 3.3$,
based on 100 mol of $BaTiO_3$, in which the internal electrodes are formed of Ni or an Ni alloy.

13. The multi-layer ceramic capacitor according to claim 12, wherein the ceramic layer has a permittivity of higher than 2,000, a temperature characteristic satisfying the X8R property, and a specific resistance of higher than 100 MΩm under a high temperature circumstance, and the multi-layer ceramic capacitor has a high temperature accelerated life property exceeding 10,000 sec at 150° C.-25 V/μm.

14. The multi-layer ceramic capacitor according to claim 13, which has a high temperature accelerated life property exceeding 100,000 sec at 150° C.-25 V/μm.

15. The multi-layer ceramic capacitor according to claim 12, wherein each dielectric ceramic layer has a thickness of 1 μm to 10 μm.

* * * * *